US009664331B1

(12) United States Patent
Caputa

(10) Patent No.: US 9,664,331 B1
(45) Date of Patent: May 30, 2017

(54) EXTENDABLE WINDOW PROP

(71) Applicant: Carmelo Caputa, St. Louis, MO (US)

(72) Inventor: Carmelo Caputa, St. Louis, MO (US)

( * ) Notice: Subject to any disclaimer, the term of this patent is extended or adjusted under 35 U.S.C. 154(b) by 0 days.

(21) Appl. No.: 15/240,795

(22) Filed: Aug. 18, 2016

(51) Int. Cl.
*F16M 11/28* (2006.01)
*E04G 25/04* (2006.01)
*E04F 21/18* (2006.01)
*A47L 1/00* (2006.01)

(52) U.S. Cl.
CPC ............ *F16M 11/28* (2013.01); *E04G 25/04* (2013.01); *A47L 1/00* (2013.01); *E04F 21/1805* (2013.01); *F16M 2200/028* (2013.01)

(58) Field of Classification Search
CPC .. F16M 11/28; F16M 11/26; F16M 2200/028; A47L 1/00; E05Y 2800/744; E05Y 2800/692; E05Y 2900/148; F16B 7/10; E04G 25/1061; E04G 25/04
USPC ... 248/354.5, 158, 161, 188.1, 188.2, 188.5, 248/354.1
See application file for complete search history.

(56) References Cited

U.S. PATENT DOCUMENTS 1,247,622 A 11/1917 Berrigan
2,358,865 A * 9/1944 McPherson ......... E04F 21/1805 248/188.7
4,300,796 A 11/1981 Lane
4,763,865 A * 8/1988 Danner .................. F16M 11/38 108/118
5,927,664 A * 7/1999 Schmidt .................... A47L 1/00 248/176.1
5,979,854 A * 11/1999 Lundgren ........... E04F 21/1822 248/354.3
6,075,440 A 6/2000 Carroll
6,417,770 B1 7/2002 Sturznickel
D485,742 S 1/2004 Heberle
8,162,272 B2 * 4/2012 Trott ......................... A47L 1/00 248/176.3
8,469,427 B1 * 6/2013 Mejia ...................... B66F 19/00 294/209
9,599,278 B2 * 3/2017 Ruckman .................. A47L 3/00
2010/0096529 A1 * 4/2010 Kritsky ................. E06B 3/5063 248/407

FOREIGN PATENT DOCUMENTS

EP 1282123 10/2008
WO WO2006053276 5/2006

* cited by examiner

*Primary Examiner* — Anita M King

(57) ABSTRACT

An extendable window prop for supporting double-hung windows includes a pole that is of adjustable length. A crossbar is coupled to and extends perpendicularly from an upper end of the pole. A first rod is coupled proximate to the upper end of the pole and extends substantially perpendicularly from the pole. The first rod is substantially perpendicular to the crossbar. A second rod is coupled to and extends substantially perpendicularly from the first rod distal from the pole. The second rod is transverse to the pole. The crossbar is positioned on the pole such that the crossbar is configured to position a first window. The first window is supported by the pole. The second rod is positioned on the first rod such that the second rod is positioned to abut a frame of the first window that is positioned on the crossbar.

14 Claims, 4 Drawing Sheets

EXTENDABLE WINDOW PROP

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98.

The disclosure and prior art relates to window props and more particularly pertains to a new window prop for supporting double-hung windows.

BRIEF SUMMARY OF THE INVENTION

An embodiment of the disclosure meets the needs presented above by generally comprising a pole that is of adjustable length. A crossbar is coupled to and extends perpendicularly from an upper end of the pole. A first rod is coupled proximate to the upper end of the pole and extends substantially perpendicularly from the pole. The first rod is substantially perpendicular to the crossbar. A second rod is coupled to and extends substantially perpendicularly from the first rod distal from the pole. The second rod is transverse to the pole. The crossbar is positioned on the pole such that the crossbar is configured to position a first window. The first window is supported by the pole. The second rod is positioned on the first rod such that the second rod is positioned to abut a frame of the first window that is positioned on the crossbar.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
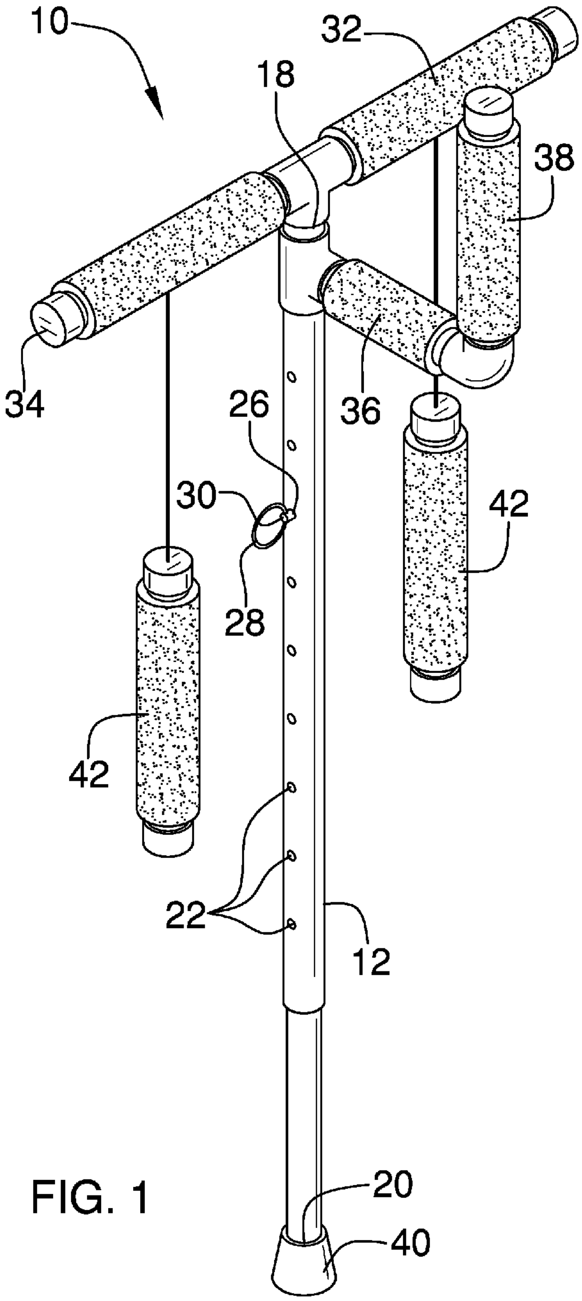
FIG. 1 is an isometric perspective view of an extendable window prop according to an embodiment of the disclosure.
Figure 2:
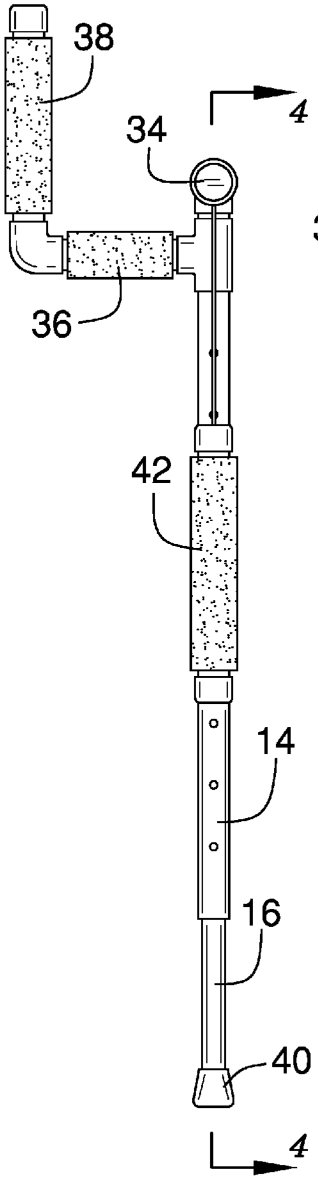
FIG. 2 is a side view of an embodiment of the disclosure.
Figure 3:
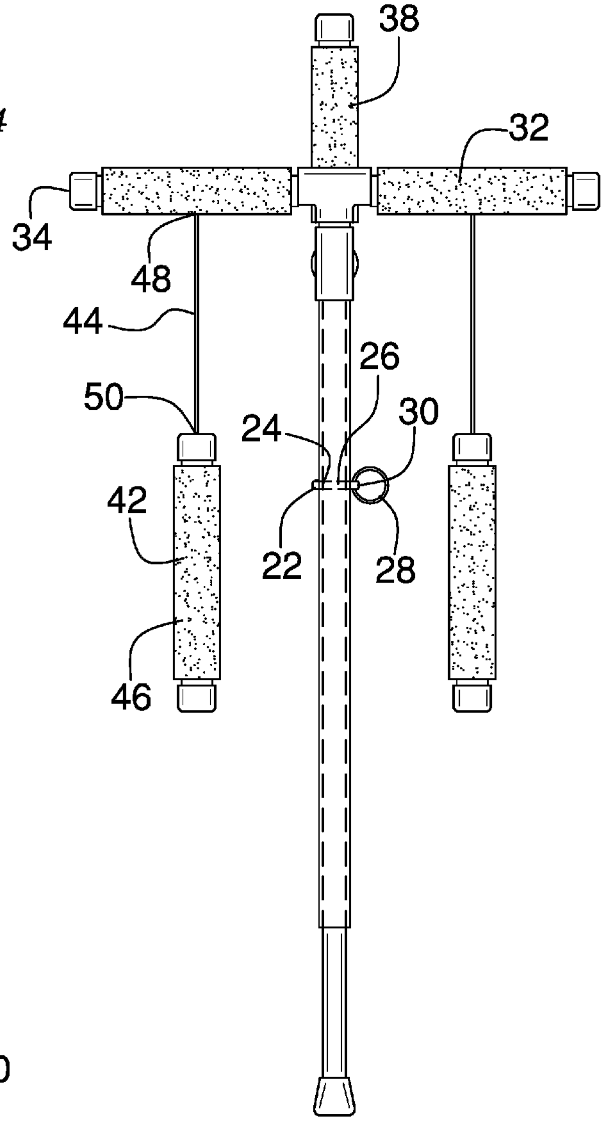
FIG. 3 is a rear view of an embodiment of the disclosure.
Figure 4:
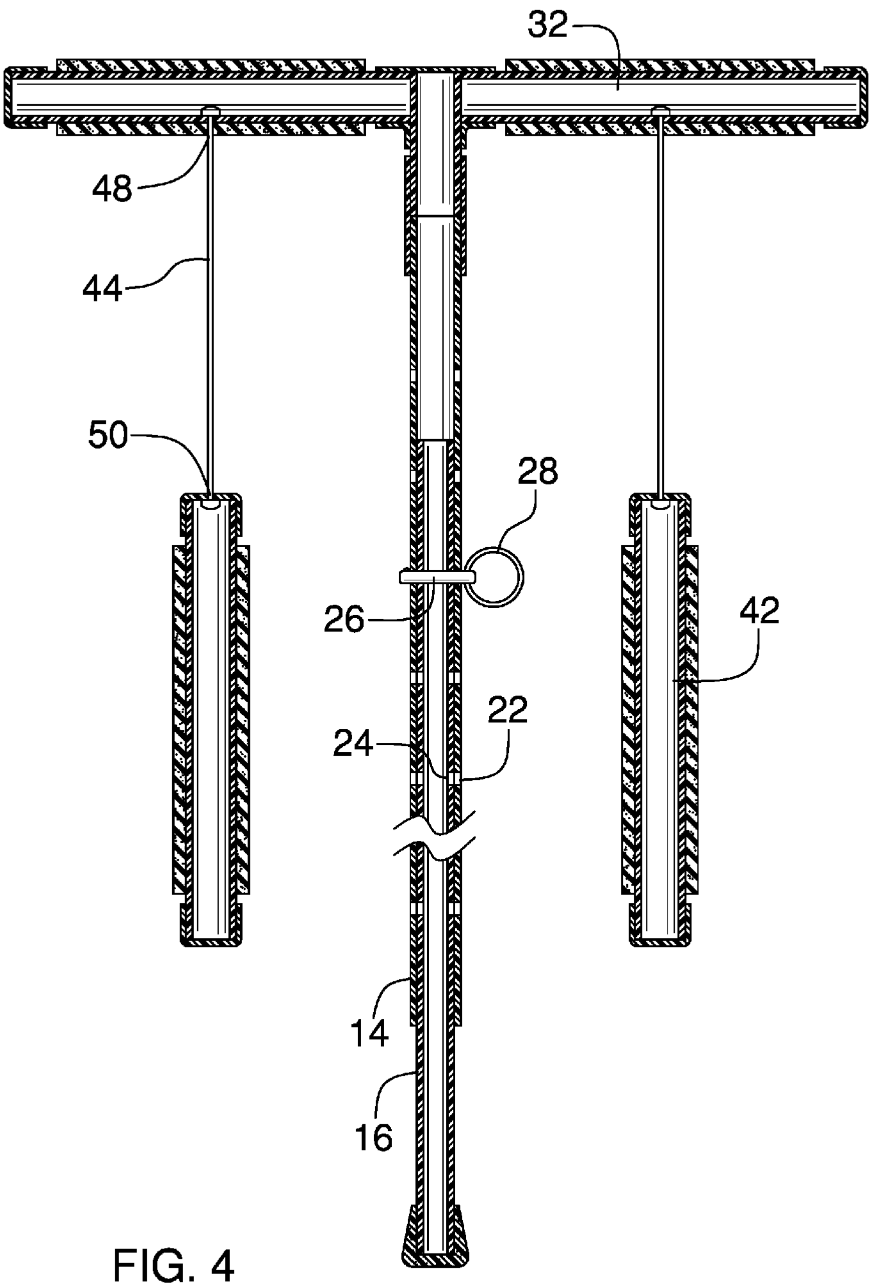
FIG. 4 is a cross-sectional view of an embodiment of the disclosure.
Figure 5:
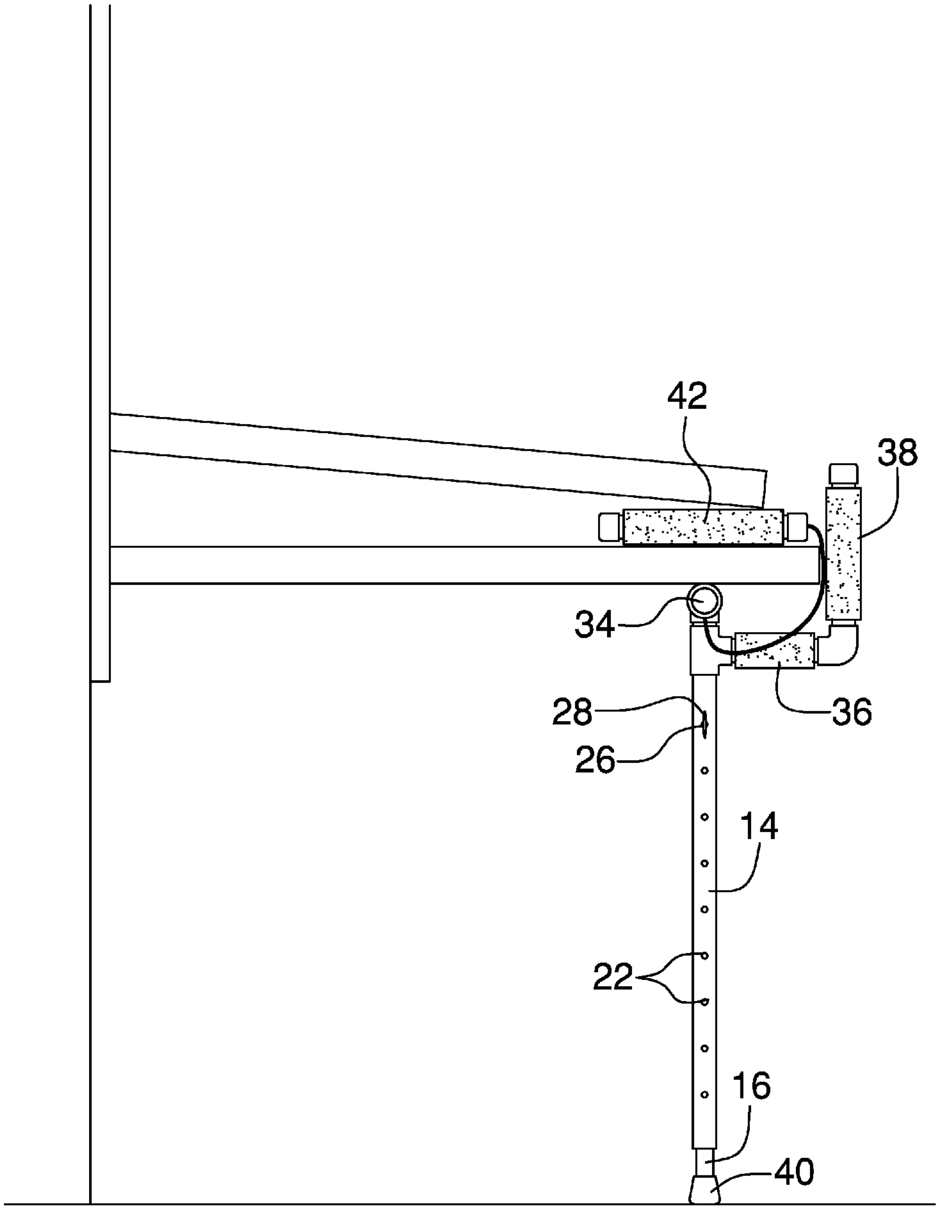
FIG. 5 is an in-use view of an embodiment of the disclosure.

With reference now to the drawings, and in particular to FIGS. 1 through 5 thereof, a new window prop embodying the principles and concepts of an embodiment of the disclosure and generally designated by the reference numeral 10 will be described.

As best illustrated in FIGS. 1 through 5, the extendable window prop 10 generally comprises a pole 12 that is of adjustable length. In one embodiment, the pole 12 comprises an upper section 14 and a lower section 16. The lower section 16 is adjustably insertable into the upper section 14. An upper end 18 and a lower end 20 of the pole 12 are variably positionable. In another embodiment, the pole 12 is substantially circular when viewed longitudinally.

A plurality of orifices 22 is positioned in the upper section 14. The orifices 22 are arrayed longitudinally. A plurality of holes 24 is positioned in the lower section 16. The holes 24 are complementary to the orifices 22. The holes 24 are positioned in the lower section 16 such that the holes 24 are selectively alignable with the orifices 22. A pin 26 that is complementary to the orifices 22 and the holes 24 is positioned to insert through a respective orifice 22 and a respective hole 24 to couple the lower section 16 to the upper section 14. The upper end 18 and the lower end 20 of the pole 12 are thus fixedly positioned.

In one embodiment, a ring 28 is coupled to the pin 26 proximate to an exposed end 30 of the pin 26. The ring 28 is positioned on the pin 26 such that the ring 28 is configured to insert one or more fingers of a user's hand. The pin 26 is extractable from the respective orifice 22 and the respective hole 24 to decouple the lower section 16 from the upper section 14.

A crossbar 32 is coupled to and extends perpendicularly from the upper end 18 of the pole 12. The crossbar 32 is positioned on the pole 12 such that the crossbar 32 is configured to position a first window. The first window is supported by the pole 12. In one embodiment, the pole 12 is positioned substantially equally distant from opposing ends 34 of the crossbar 32. In another embodiment, the crossbar 32 is padded. In yet another embodiment, the crossbar 32 is substantially circular when viewed longitudinally.

A first rod 36 is coupled proximate to the upper end 18 of the pole 12 and extends substantially perpendicularly from the pole 12. The first rod 36 also is substantially perpendicular to the crossbar 32. In one embodiment, the first rod 36 is padded. In another embodiment, the first rod 36 is substantially circular when viewed longitudinally.

A second rod 38 is coupled to and extends substantially perpendicularly from the first rod 36 distal from the pole 12. The second rod 38 is transverse to the pole 12. The second rod 38 is positioned on the first rod 36 such that the second rod 38 is positioned to abut a frame of the first window that is positioned on the crossbar 32. In one embodiment, the second rod 38 is padded. In another embodiment, the second rod 38 is substantially circular when viewed longitudinally.

In one embodiment, a foot 40 is coupled to the lower end 20 of the pole 12. The foot 40 is positioned on the pole 12 such that the foot 40 is configured to frictionally couple to a substantially horizontal surface to deter lateral slippage of the pole 12. In another embodiment, the foot 40 comprises rubber.

In one embodiment, each of a pair of spacers 42 is flexibly coupled to the crossbar 32 substantially equally distant from the pole 12 and a respective opposing end 34 of the crossbar 32. The spacers 42 are positioned on the crossbar 32 such that the spacers 42 are configured to insert between the first window that is positioned on the crossbar 32 and a second window that is positioned above and in substantial parallelism with the first window. The first window and the second window are supported by the pole 12.

In another embodiment, each spacer 42 comprises a cable 44 and a tube 46. The cable 44 has a first end 48 that is coupled to the crossbar 32. The tube 46 is coupled to a second end 50 of the cable 44. In yet another embodiment, the tube 46 is padded. In still yet another embodiment, the tube 46 is substantially circular when viewed longitudinally. The cable 44 is coupled to the crossbar 32 and the tube 46 such that the tube 46 is configured to position between the first window and the second window.

In use, the pin 26 is positioned to insert through a respective orifice 22 and a respective hole 24 to couple the lower section 16 to the upper section 14. The upper end 18 and the lower end 20 of the pole 12 are fixedly positioned. The crossbar 32 is positioned on the pole 12 such that the crossbar 32 is configured to position a first window. The first window is supported by the pole 12. The second rod 38 is positioned on the first rod 36 such that the second rod 38 is positioned to abut a frame of the first window that is positioned on the crossbar 32. The spacers 42 are positioned on the crossbar 32 such that the spacers 42 are configured to insert between the first window that is positioned on the crossbar 32 and a second window that is positioned above and in substantial parallelism with the first window. The first window and second window are supported by the pole 12. The foot 40 is positioned on the pole 12 such that the foot 40 is configured to frictionally couple to a substantially horizontal surface to deter lateral slippage of the pole 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An extendable window prop comprising:

a pole, said pole being of adjustable length;

a crossbar coupled to and extending perpendicularly from an upper end of said pole;

a first rod coupled proximate to said upper end of said pole and extending substantially perpendicularly from said pole, said first rod being substantially perpendicular to said crossbar;

a second rod coupled to and extending substantially perpendicularly from said first rod distal from said pole, said second rod being transverse to said pole; and wherein said crossbar is positioned on said pole such that said crossbar is configured for positioning a first window, such that the first window is supported by said pole, wherein said second rod is positioned on said first rod such that said second rod is positioned to abut a frame of the first window positioned on said crossbar.

2. The prop of claim 1, further including said pole being positioned substantially equally distant from opposing ends of said crossbar.

3. The prop of claim 1, further including said pole comprising an upper section and a lower section, said lower section being adjustably insertable into said upper section, such that said upper end and a lower end of said pole are variably positionable.

4. The prop of claim 1, further including said first rod, said second rod and said crossbar being padded.

5. The prop of claim 1, further including said pole, said first rod, said second rod and said crossbar being substantially circular when viewed longitudinally.

6. The prop of claim 3, further comprising:

a plurality of orifices positioned in said upper section, said orifices being arrayed longitudinally;

a plurality of holes positioned in said lower section, said holes being complementary to said orifices, wherein said holes are positioned is said lower section such that said hole are selectively alignable with said orifices;

a pin complementary to said orifices and said holes; and wherein said pin is positioned for insertion through a respective said orifice and a respective said hole to couple said lower section to said upper section, such that said upper end and said lower end of said pole are fixedly positioned.

7. The prop of claim 6, further including a ring coupled to said pin proximate to an exposed end of said pin, wherein said ring is positioned on said pin such that said ring is configured for insertion of one or more fingers of a user's hand, such that said pin is extractable from said respective said orifice and said respective said hole to decouple said lower section from said upper section.

8. The prop of claim 1, further including a pair of spacers, each said spacer being flexibly coupled to said crossbar substantially equally distant from said pole and a respective said opposing end of said crossbar, wherein said spacers are positioned on said crossbar such that said spacers are configured for insertion between the first window positioned on said crossbar and a second window positioned above and in substantial parallelism with the first window, such that the first window and the second window are supported by said pole.

9. The prop of claim 8, further including each said spacer comprising:

a cable having a first end, said first end being coupled to said crossbar;

a tube coupled to a second end of said cable, said tube being padded, said tube being substantially circular when viewed longitudinally; and wherein said cable is coupled to said crossbar and said tube such that said tube is configured for positioning between the first window and the second window.

10. The prop of claim 9, further including said tube being padded.

11. The prop of claim 9, further including said tube being substantially circular when viewed longitudinally.

12. The prop of claim 1, further including a foot coupled to a lower end of said pole, wherein said foot is positioned on said pole such that said foot is configured to frictionally couple to a substantially horizontal surface to deter lateral slippage of said pole.

13. The prop of claim 12, further including said foot comprising rubber.

14. An extendable window prop comprising:

a pole, said pole being of adjustable length, said pole comprising an upper section and a lower section, said lower section being adjustably insertable into said upper section, such that an upper end and a lower end of said pole are variably positionable, said pole being substantially circular when viewed longitudinally;

a plurality of orifices positioned in said upper section, said orifices being arrayed longitudinally;

a plurality of holes positioned in said lower section, said holes being complementary to said orifices, wherein said holes are positioned is said lower section such that said hole are selectively alignable with said orifices;

a pin complementary to said orifices and said holes, wherein said pin is positioned for insertion through a respective said orifice and a respective said hole to couple said lower section to said upper section, such that said upper end and said lower end of said pole are fixedly positioned;

a ring coupled to said pin proximate to an exposed end of said pin, wherein said ring is positioned on said pin such that said ring is configured for insertion of one or more fingers of a user's hand, such that said pin is extractable from said respective said orifice and said respective said hole to decouple said lower section from said upper section;

a crossbar coupled to and extending perpendicularly from said upper end of said pole, wherein said crossbar is positioned on said pole such that said crossbar is configured for positioning of a first window, such that the first window is supported by said pole, said pole being positioned substantially equally distant from opposing ends of said crossbar, said crossbar being padded, said crossbar being substantially circular when viewed longitudinally;

a first rod coupled proximate to said upper end of said pole and extending substantially perpendicularly from said pole, said first rod being substantially perpendicular to said crossbar, said first rod being padded, said first rod being substantially circular when viewed longitudinally;

a second rod coupled to and extending substantially perpendicularly from said first rod distal from said pole, said second rod being transverse to said pole, wherein said second rod is positioned on said first rod such that said second rod is positioned to abut a frame of the first window positioned on said crossbar, said second rod being padded, said second rod being substantially circular when viewed longitudinally;

a foot coupled to said lower end of said pole, wherein said foot is positioned on said pole such that said foot is configured to frictionally couple to a substantially horizontal surface to deter lateral slippage of said pole, said foot comprising rubber;

a pair of spacers, each said spacer being flexibly coupled to said crossbar substantially equally distant from said pole and a respective said opposing end of said crossbar, wherein said spacers are positioned on said crossbar such that said spacers are configured for insertion between the first window positioned on said crossbar and a second window positioned above and in substantial parallelism with the first window, such that the first window and the second window are supported by said pole, each said spacer comprising:

a cable having a first end, said first end being coupled to said crossbar, a tube coupled to a second end of said cable, said tube being padded, said tube being substantially circular when viewed longitudinally, and wherein said cable is coupled to said crossbar and said tube such that said tube is configured for positioning between the first window and the second window; and wherein said pin is positioned for insertion through a respective said orifice and a respective said hole to couple said lower section to said upper section, such that said upper end and said lower end of said pole are fixedly positioned, wherein said crossbar is positioned on said pole such that said crossbar is configured for positioning a first window, such that the first window is supported by said pole, wherein said second rod is positioned on said first rod such that said second rod is positioned to abut a frame of the first window positioned on said crossbar, wherein said spacers are positioned on said crossbar such that said spacers are configured for insertion between the first window positioned on said crossbar and a second window positioned above and in substantial parallelism with the first window, such that the first window and second window are supported by said pole, wherein said foot is positioned on said pole such that said foot is configured to frictionally couple to a substantially horizontal surface to deter lateral slippage of said pole.

* * * * *